(12) United States Patent
Zhang et al.

(10) Patent No.: US 10,594,568 B2
(45) Date of Patent: Mar. 17, 2020

(54) METHOD AND APPARATUS FOR MEASURING A DATA TRANSMISSION SPEED, DEVICE AND COMPUTER READABLE MEDIUM

(71) Applicant: Beijing Baidu Netcom Science and Technology Co., Ltd., Beijing (CN)

(72) Inventors: Jian Zhang, Beijing (CN); Jiaoren Wu, Beijing (CN); Hao Jiang, Beijing (CN); Yongxin Cui, Beijing (CN); Ning Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 16/129,885

(22) Filed: Sep. 13, 2018

(65) Prior Publication Data

US 2019/0173763 A1   Jun. 6, 2019

(30) Foreign Application Priority Data

Dec. 1, 2017   (CN) .......................... 2017 1 1251209

(51) Int. Cl.
*H04L 12/24*   (2006.01)
*H04W 24/08*   (2009.01)
(Continued)

(52) U.S. Cl.
CPC .......... *H04L 41/142* (2013.01); *H04L 41/147* (2013.01); *H04W 24/08* (2013.01);
(Continued)

(58) Field of Classification Search
CPC ... H04L 41/142; H04L 69/326; H04L 5/0055; H04L 12/24; H04L 5/00; H04W 24/08; H04W 80/04
See application file for complete search history.

(56) References Cited

U.S. PATENT DOCUMENTS

2005/0018617 A1*  1/2005  Jin .......................... H04L 47/10
                                                      370/252
2006/0050640 A1   3/2006  Jin et al.
(Continued)

FOREIGN PATENT DOCUMENTS

CN   1871806 A      11/2006
CN   101634995 A    1/2010
(Continued)

OTHER PUBLICATIONS

Notification on Grant of the Patent Right for Invention dated Dec. 4, 2018, for corresponding Chinese Application No. 201711251209.5.

(Continued)

*Primary Examiner* — Chi Ho A Lee
(74) *Attorney, Agent, or Firm* — Kinney & Lange, P.A.

(57) ABSTRACT

A method for measuring a data transmission speed, applied to a server side, is provided. The method includes: updating RTTs within a current sliding period upon receiving an ACK message from a client device; calculating a maximum RTT, a minimum RTT and an average RTT within the current sliding period; obtaining an amount of data in the latest RTT; calculating a minimum speed, a maximum speed and an average speed respectively, according to the amount of data in the latest RTT, and the maximum RTT, the minimum RTT and the average RTT within the current sliding period; calculating speed change gradient information according to the minimum speed, the maximum speed and the average speed; and calculating a speed prediction value according to the speed change gradient information. An apparatus for measuring a data transmission speed, a server-side device and a computer readable medium are provided.

20 Claims, 8 Drawing Sheets

(51) Int. Cl.
  *H04L 29/08* (2006.01)
  *H04L 5/00* (2006.01)
  *H04L 12/26* (2006.01)

(52) U.S. Cl.
  CPC ........ *H04L 5/0055* (2013.01); *H04L 43/0847* (2013.01); *H04L 43/0864* (2013.01); *H04L 69/326* (2013.01)

(56) References Cited

U.S. PATENT DOCUMENTS

| | | | | |
|---|---|---|---|---|
| 2011/0013516 | A1* | 1/2011 | Black | H04L 43/0888 370/236 |
| 2015/0237164 | A1* | 8/2015 | Mohammad Mirzaei | H04W 4/33 709/203 |
| 2015/0281014 | A1* | 10/2015 | Okada | H04L 43/067 370/253 |
| 2016/0218838 | A1* | 7/2016 | Cui | H04B 7/2643 |
| 2017/0195231 | A1* | 7/2017 | Lopez Serrano | H04L 47/11 |
| 2018/0159778 | A1* | 6/2018 | Lee | H04L 47/193 |
| 2019/0068512 | A1* | 2/2019 | Papaloukopoulos | H04L 41/145 |
| 2019/0081744 | A1* | 3/2019 | Yang | H04W 72/0413 |
| 2019/0141754 | A1* | 5/2019 | Bai | H04W 56/001 |

FOREIGN PATENT DOCUMENTS

| | | |
|---|---|---|
| CN | 103763156 A | 4/2014 |
| CN | 103841136 A | 6/2014 |
| CN | 106162831 A | 11/2016 |
| CN | 106713166 A | 5/2017 |
| CN | 106878192 A | 6/2017 |
| EP | 3135009 A1 | 3/2017 |
| WO | 2014132471 A1 | 9/2014 |

OTHER PUBLICATIONS

Search Report dated Nov. 23, 2018, for corresponding Chinese Application No. 201711251209.5.
First Chinese Office Action dated Jul. 24, 2018, for corresponding Chinese Application No. 201711251209.5.

* cited by examiner

METHOD AND APPARATUS FOR MEASURING A DATA TRANSMISSION SPEED, DEVICE AND COMPUTER READABLE MEDIUM

CROSS-REFERENCE TO RELATED APPLICATION(S)

This application claims priority to Chinese Patent Application No. 201711251209.5, filed on Dec. 1, 2017, which is hereby incorporated by reference in its entirety.

TECHNICAL FIELD

The present disclosure relates to the technical field of Internet information transmission, and particularly to a method and apparatus for measuring a data transmission speed, a device and a computer readable medium.

BACKGROUND

A method of performing a speed measurement for a Transmission Control Protocol (TCP) connection in relevant technologies mainly includes: a method of obtaining an instantaneous value in a Round-Trip Time (RTT), a method of obtaining a moving average in a period, and a method of obtaining a maximum, a minimum and an average in a time window. The method of obtaining the instantaneous value in the RTT includes: determining a maximum from the number of bytes sent within each RTT and the number of bytes acknowledged within each RTT; and dividing the maximum by a time interval of the RTT, to obtain an instantaneous speed within the current RTT. The RTT is an important performance index in a computer network, and represents a total time delay starting from a transmitter's data transmission to the transmitter's reception of a confirmation from a receiver. The method of obtaining a moving average in a period includes: setting a movable window; performing speed measurement in the RTT of each transmission; determining a speed average in the whole movable window as a speed of the movable window; adjusting the starting point of the window as time goes on; moving forward one RTT each time; and computing successively. The method of obtaining a maximum, a minimum and an average in a time window includes: setting a time window; and calculating the speed maximum, the speed minimum and the speed average within the time window.

In a wide area network scenario, for reasons such as frequent speed changes and fluctuations, sudden rise and fall of bandwidth, and measurement delay, a speed measured by the above speed-measuring method deviates significantly away from a speed actually reached by the user, thereby causing a misjudgment phenomenon to other relevant adjustments, affecting a real data transmission speed, and reducing the user's experience.

SUMMARY

A method and apparatus for measuring a data transmission speed, a device and a computer readable medium are provided according to embodiments of the present disclosure, to solve at least one of the above technical problems in the existing technology.

In a first aspect, a method for measuring a data transmission speed is provided according to an embodiment of the disclosure. The method is applied to a server side, and includes:

updating Round-Trip Times (RTTs) within a current sliding period upon receiving an acknowledgement (ACK) message from a client device;

calculating a maximum RTT, a minimum RTT and an average RTT within the current sliding period;

obtaining an amount of data in the latest RTT;

calculating a minimum speed, a maximum speed and an average speed respectively, according to the amount of data in the latest RTT, and the maximum RTT, the minimum RTT and the average RTT within the current sliding period;

calculating speed change gradient information according to the minimum speed, the maximum speed and the average speed; and calculating a speed prediction value according to the speed change gradient information.

In conjunction with the first aspect, in a first implementation mode of the first aspect of the present disclosure, updating RTTs within a current sliding period upon receiving an ACK message from a client includes:

obtaining the latest RTT upon receiving the ACK message from the client device;

updating an RTT list rtt_list according to the latest RTT, the updated rtt_list recording N RTTs, the N RTTs including the latest RTT and N−1 RTTs which are sequentially closest to the latest RTT in time, the updated rtt_list being rtt_list within the current sliding period;

wherein N is an integer larger than 1.

In conjunction with the first implementation mode of the first aspect, in a second implementation mode of the first aspect of the present disclosure, calculating a maximum RTT, a minimum RTT and an average RTT within the current sliding period includes:

traversing all RTTs in the rtt_list in the current sliding period in turn; selecting an RTT with a maximum time interval as the maximum RTT, and an RTT with a minimum time interval as the minimum RTT; and obtaining the average RTT by dividing a sum of all RTTs in the rtt_list by the number N of the RTTs in the rtt_list.

In conjunction with the first aspect, in a third implementation mode of the first aspect of the present disclosure, obtaining an amount of data in the latest RTT includes:

obtaining preset fields, including last_send_bytes, send_bytes, last_delivered_bytes, delivered_bytes and record_timestamp, wherein the amount of data sent by the end of a last sliding period is recorded into last_send_bytes, the amount of data sent by the end of the current sliding period is recorded into send_bytes, the amount of data acknowledged by the end of the last sliding period is recorded into last_delivered_bytes, the amount of data acknowledged by the end of the current sliding period is recorded into delivered_bytes, and a cutoff time of the last sliding period is recorded into record_timestamp;

calculating the amount of data sent within the latest RTT by an equation send=send_bytes−last_send_bytes, and the amount of data acknowledged within the latest RTT by an equation delivered=delivered_bytes−last_delivered_bytes; and selecting the amount of data with a maximum value as the amount of data (payload) in the latest RTT, from the amount of data (send) sent within the latest RTT, and the amount of data (delivered) acknowledged within the latest RTT.

In conjunction with the first aspect, in a fourth implementation mode of the first aspect of the present disclosure, calculating a minimum speed, a maximum speed and an average speed respectively, according to the amount of data in the latest RTT, and the maximum RTT, the minimum RTT and the average RTT within the current sliding period includes:

calculating the minimum speed: speed_min=payload/rtt_max;

calculating the maximum speed: speed_max=payload/rtt_min;

calculating the average speed: speed_ava=payload/rtt_ava;

wherein payload represents the amount of data in the latest RTT, rtt_max represents the maximum RTT within the current sliding period, rtt_min represents the minimum RTT within the current sliding period, and rtt_ava represents the average RTT within the current sliding period.

In conjunction with the fourth implementation mode of the first aspect, in a fifth implementation mode of the first aspect of the present disclosure, calculating speed change gradient information according to the minimum speed, the maximum speed and the average speed includes:

calculating speed change gradient information D=[D0, D1, D2, D3] according to a group of preset coefficients [w0, w1, w2, w3], and following equations:

$$var=w0*CONST+w1*speed\_max+w2*speed\_min+w3*speed\_ava,$$

$$delta=speed\_max-var,$$

$$D0=p*delta*CONST,$$

$$D1=p*delta*speed\_max,$$

$$D2=p*delta*speed\_min,$$

$$D3=p*delta*speed\_ava,$$

wherein p is a preset scaling factor, CONST is a present constant, speed_max represents the calculated maximum speed, speed_min represents the calculated minimum speed, and speed_ava represents the calculated average speed.

In conjunction with the fifth implementation mode of the first aspect, in a sixth implementation mode of the first aspect of the present disclosure, calculating a speed prediction value according to the speed change gradient information includes:

updating a vector W [w0', w1', w2', w3'] according to the preset coefficients [w0, w1, w2, w3] and the speed change gradient information, so that w0'=w0+D0, w1'=w1+D1, w2'=w2+D2, w3'=w3+D3;

calculating the speed prediction value SPD_h according to an equation:

$$SPD\_h=w0'*CONST+w1'*speed\_max+w2'*speed\_min+w3'*speed\_ava.$$

In conjunction with the first aspect, in a seventh implementation mode of the first aspect of the present disclosure, after obtaining the speed prediction value, the method further includes:

modifying the speed prediction value according to a maintained speed adjustment index C_INDEX, to obtain a modified speed prediction value.

In conjunction with the seventh implementation mode of the first aspect, in an eighth implementation mode of the first aspect of the present disclosure, after obtaining the modified speed prediction value, the method further includes:

calculating a Bandwidth-delay product (BDP) according to the modified speed prediction value by an equation: BDP=SPD_adj*rtt_min, wherein SPD_adj represents the modified speed prediction value, and rtt_min represents the minimum RTT within the current sliding period; and calculating a congestion window (CWND) according to the calculated BDP by an equation: CWND=BDP/MSS, wherein MSS represents a preset max segment size.

In a second aspect, an apparatus for measuring a data transmission speed is provided according to an embodiment of the disclosure. The apparatus is applied to a server side, and includes:

a Round-Trip Time (RTT) updating unit configured to update RTTs within a current sliding period upon receiving an acknowledgement (ACK) message from a client device;

an RTT obtaining unit configured to calculate a maximum RTT, a minimum RTT and an average RTT within the current sliding period;

an amount of data obtaining unit configured to obtain an amount of data in the latest RTT;

a speed calculating unit configured to calculate a minimum speed, a maximum speed and an average speed respectively, according to the amount of data in the latest RTT, and the maximum RTT, the minimum RTT and the average RTT within the current sliding period;

a gradient information obtaining unit configured to calculate speed change gradient information according to the minimum speed, the maximum speed and the average speed;

a speed prediction value obtaining unit configured to calculate a speed prediction value according to the speed change gradient information.

In conjunction with the second aspect, in a first implementation mode of the second aspect of the present disclosure, the RTT updating unit is further configured to:

obtain the latest RTT upon receiving the ACK message from the client device;

update an RTT list rtt_list according to the latest RTT, the updated rtt_list recording N RTTs, the N RTTs including the latest RTT and N−1 RTTs which are sequentially closest to the latest RTT in time, the updated rtt_list being rtt_list within the current sliding period;

wherein N is an integer larger than 1.

In conjunction with the first implementation mode of the second aspect, in a second implementation mode of the second aspect of the present disclosure, the RTT obtaining unit is further configured to:

traverse all RTTs in the rtt_list in the current sliding period in turn, select an RTT with a maximum time interval as the maximum RTT, and an RTT with a minimum time interval as the minimum RTT, and obtaining the average RTT by dividing a sum of all RTTs in the rtt_list by the number N of the RTTs in the rtt_list.

In conjunction with the second aspect, in a third implementation mode of the second aspect of the present disclosure, the amount of data obtaining unit is further configured to:

obtain preset fields, including last_send_bytes, send_bytes, last_delivered_bytes, delivered_bytes and record_timestamp, wherein the amount of data sent by the end of a last sliding period is recorded into last_send_bytes, the amount of data sent by the end of the current sliding period is recorded into send_bytes, the amount of data acknowledged by the end of the last sliding period is recorded into last_delivered_bytes, the amount of data acknowledged by the end of the current sliding period is recorded into delivered_bytes, and a cutoff time of the last sliding period is recorded into record_timestamp;

calculate the amount of data sent within the latest RTT by an equation send=send_bytes-last_send_bytes, and the amount of data acknowledged within the latest RTT by an equation delivered=delivered_bytes-last_delivered_bytes; and select the amount of data with a maximum value as the amount of data (payload) in the latest RTT, from the amount of data (send) sent within the latest RTT, and the amount of data (delivered) acknowledged within the latest RTT.

In conjunction with the second aspect, in a fourth implementation mode of the second aspect of the present disclosure, the speed calculating unit is further configured to:

calculate the minimum speed: speed_min=payload/rtt_max;

calculate the maximum speed: speed_max=payload/rtt_min;

calculate the average speed: speed_ava=payload/rtt_ava;

wherein payload represents the amount of data in the latest RTT, rtt_max represents the maximum RTT within the current sliding period, rtt_min represents the minimum RTT within the current sliding period, and rtt_ava represents the average RTT within the current sliding period.

In conjunction with the fourth implementation mode of the second aspect, in a fifth implementation mode of the second aspect of the present disclosure, the gradient information obtaining unit is further configured to:

calculate speed change gradient information D=[D0, D1, D2, D3] according to a group of preset coefficients [w0, w1, w2, w3], and following equations:

$$var=w0*CONST+w1*speed\_max+w2*speed\_min+w3*speed\_ava,$$

$$delta=speed\_max-var,$$

$$D0=p*delta*CONST,$$

$$D1=p*delta*speed\_max,$$

$$D2=p*delta*speed\_min,$$

$$D3=p*delta*speed\_ava,$$

wherein p is a preset scaling factor, CONST is a present constant, speed_max represents the calculated maximum speed, speed_min represents the calculated minimum speed, and speed_ava represents the calculated average speed.

In conjunction with the fifth implementation mode of the second aspect, in a sixth implementation mode of the second aspect of the present disclosure, the speed prediction value obtaining unit is further configured to:

update a vector W [w0', w1', w2', w3'] according to the preset coefficients [w0, w1, w2, w3] and the speed change gradient information, so that w0'=w0+D0, w1'=w1+D1, w2'=w2+D2, w3'=w3+D3;

calculate the speed prediction value SPD_h according to an equation:

$$SPD\_h=w0'*CONST+w1'*speed\_max+w2'*speed\_min+w3'*speed\_ava.$$

In conjunction with the second aspect, in a seventh implementation mode of the second aspect of the present disclosure, the apparatus further includes: a speed modifying unit configured to modify the speed prediction value according to a maintained speed adjustment index C_INDEX, to obtain a modified speed prediction value.

In conjunction with the seventh implementation mode of the second aspect, in an eighth implementation mode of the second aspect of the present disclosure, the apparatus further includes: a congestion window calculating unit configured to calculate a Bandwidth-delay product (BDP) according to the modified speed prediction value by an equation: BDP=SPD_adj*rtt_min, wherein SPD_adj represents the modified speed prediction value, and rtt_min represents the minimum RTT within the current sliding period; and calculate a congestion window (CWND) according to the calculated BDP by an equation: CWND=BDP/MSS, wherein MSS represents a preset max segment size.

Functions of the above units may be implemented through hardware, or by hardware executing corresponding software. The hardware or software includes one or more units corresponding to the above functions.

In a possible design, a structure of the apparatus for measuring the data transmission speed includes a processor and a memory, the memory being used to store a program of supporting the apparatus for measuring the data transmission speed to execute the method for measuring the data transmission speed in the abovementioned first aspect, the processor being configured to execute the program stored in the memory. The apparatus for measuring the data transmission speed may further include a communication interface configured to enable the apparatus for measuring the data transmission speed to communicate with other devices or communication networks.

In a third aspect, a non-volatile computer readable storage medium is provided according to an embodiment of the present disclosure, which is configured to store computer software instruction used by the apparatus for measuring the data transmission speed, including a program which is used to execute the method for measuring the data transmission speed in the aforesaid first aspect and involved by the apparatus for measuring the data transmission speed.

At least one technical solution in the above technical solutions has the following advantages or advantageous effects:

in the embodiments of the present disclosure, it is possible to actively track changes of an actual speed of the TCP connection during transmission according to TCP behaviors and network transmission properties, obtain a more accurate transmission speed, thereby improving the TCP transmission speed, and improving the user's experience.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, reference numbers throughout a plurality of figures represent the same or like components or elements. These figures are not necessarily drawn to scale. It should be appreciated that these figures only depict some embodiments according to the present disclosure, and should not be considered as limiting the scope of the present disclosure.

DETAILED DESCRIPTION OF EMBODIMENTS

The following text only simply describes some exemplary embodiments. As recognized by those skilled in the art, it is possible to modify the described embodiments in various manners without departing from the spirit or scope of the present disclosure. Hence, the figures and depictions are considered as being substantially exemplary not restrictive.

Embodiments of the present disclosure aim to calculate a data transmission speed not by directly obtaining an average value, but through two dimensions RTT and amount of data and based on a gradient descent principle, and meanwhile in consideration of data stability and link change sensitivity. In embodiments of the present disclosure, the same policy is employed for all application scenarios, parameters needn't be adjusted in different environments, and employment is performed only at a server without a client device's participation. Core ideas of technical solutions of the present disclosure are illustrated below in detail in embodiments.

Embodiment 1

Figure 1:
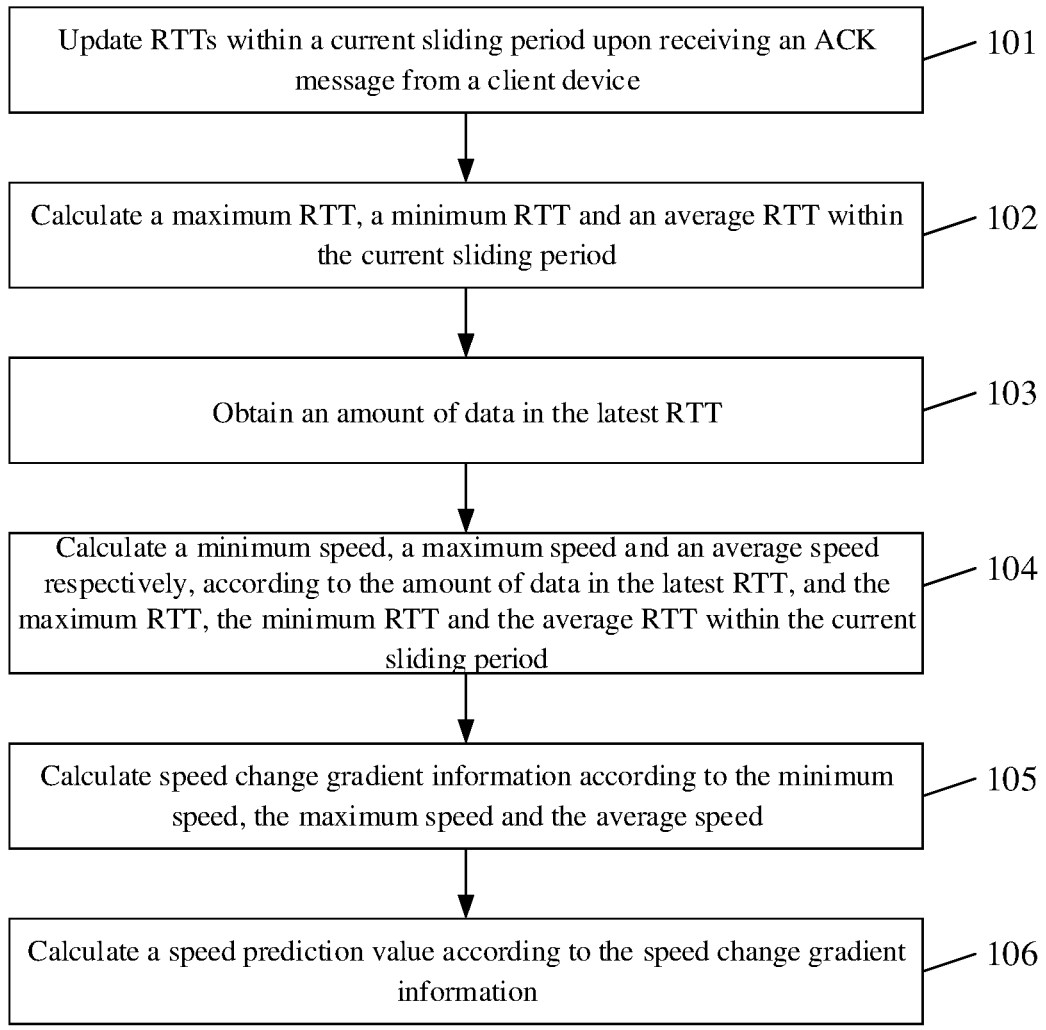
FIG. 1 is a schematic flow chart of a method for measuring a data transmission speed according to an embodiment of the present disclosure.

A method for measuring a data transmission speed is provided according to embodiment 1 of the present disclosure. The method is applied to a server side. As shown in FIG. 1, the method mainly includes steps 101-106.

Step 101, RTTs within a current sliding period are updated upon receiving an ACK message from a client device.

When the server side receives the ACK message from the client device, the method according to embodiment 1 of the present disclosure is triggered to be executed. The sliding period is a preset concept. Each sliding period may be preset to be composed of a fixed number of RTTs, for example 10 or 20, and then the sliding period is constantly updated as the RTTs are updated. Once the server side receives the ACK message from the client device, the sliding period should be updated.

The step of updating RTTs within the current sliding period includes:

obtaining a latest RTT; and updating an RTT list rtt_list according to the latest RTT, the updated rtt_list recording N RTTs, the N RTTs including the latest RTT and N-1 RTTs which are sequentially closest to the latest RTT in time; the updated rtt_list being rtt_list within the current sliding period;

wherein N is an integer larger than 1.

Specifically, the update of RTTs depends on the reception of ACK sent from the client device. The update may be performed at a congestion control inlet of a system core (e.g., Linux system core), and RTT may be tracked by adding the following fields in a tcp_sock structure body:

| Type | Field name | Remarks |
| --- | --- | --- |
| unsigned int 32 [ ] | rtt_list | To record N continuous RTTs, N is equal to 20 (the value of N may be other values depending on an actual requirement) |
| unsigned int | rtt_max | A maximum RTT within a current window |
| unsigned int | rtt_min | A minimum RTT within a current window |
| unsigned int | rtt_ava | An average RTT within a current window |

Figure 2:
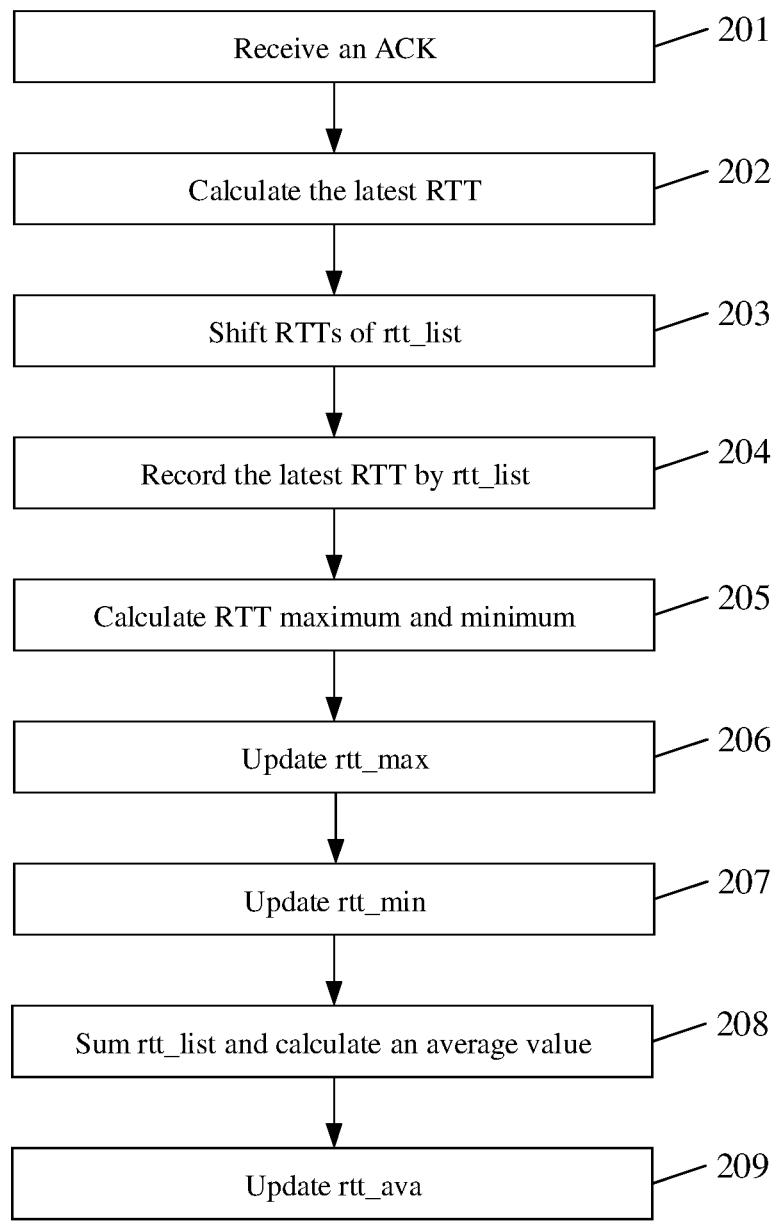
FIG. 2 is a schematic flow chart of a method for updating RTTs, calculating a maximum RTT, a minimum RTT and an average RTT according to an embodiment of the present disclosure.

In a specific implementation, an RTT updating method is as shown in steps 201-204 in FIG. 2.

Step 201, the ACK is received, and the RTT update is triggered by the arrival of ACK, and executed at the congestion control inlet.

Step 202, the latest RTT is calculated in real time, srtt in a tcp_sock structure may be directly taken as a value of the latest RTT, the value already being updated according to a standard RTT algorithm in the system core.

Step 203, RTTs in the rtt_list are shifted, each RTT in the rtt_list is identified with a subscript, a range of RTT subscript is from 0 to N-1 and data of N RTTs is recorded in turn. In the embodiment of the present disclosure, the latest RTT is recorded at an RTT with a subscription N-1, a new RTT is experienced each time, data at a location of subscript 1 moves to a location of subscript 0, data at a location of subscript 2 moves to a location of subscript 1, data at a location of subscript 3 moves to a location of subscript 2, and in the same manner, data at a location of subscript N-1 moves to a location of subscript N-2.

Step 204, the rtt_list records the latest RTT, the latest RTT is recorded at the location of subscription N-1; and the update of the rtt_list is completed update after completion of setting.

Step 102, a maximum RTT, a minimum RTT and an average RTT within the current sliding period are calculated.

In specific implementation, a method of calculating the maximum RTT, the minimum RTT and the average RTT is shown as steps 205-209 in FIG. 2.

Step 205, maximum RTT and minimum RTT in the rtt_list are calculated, wherein all RTTs in the rtt_list are traversed from subscript 0 to subscript N-1, and the maximum and minimum are recorded.

Step 206, rtt_max is updated, which is set as a maximum of the rtt_list.

Step 207, rtt_min is updated, which is set as a minimum of the rtt_list.

Step 208, the rtt_list is summed up, and an average is calculated, wherein the rtt_list is traversed, values at all N subscripts are summed up, and the sum is divided by N.

Step 209, rtt_ava is updated, which is set as the average.

The above method achieves a process of calculating the maximum RTT, minimum RTT and average RTT based on moving average, the obtained maximum, minimum and average will be used for subsequent speed calculation, and the rtt_list, rtt_max, rtt_min and rtt_ava all are latest values after update each time.

Figure 3:
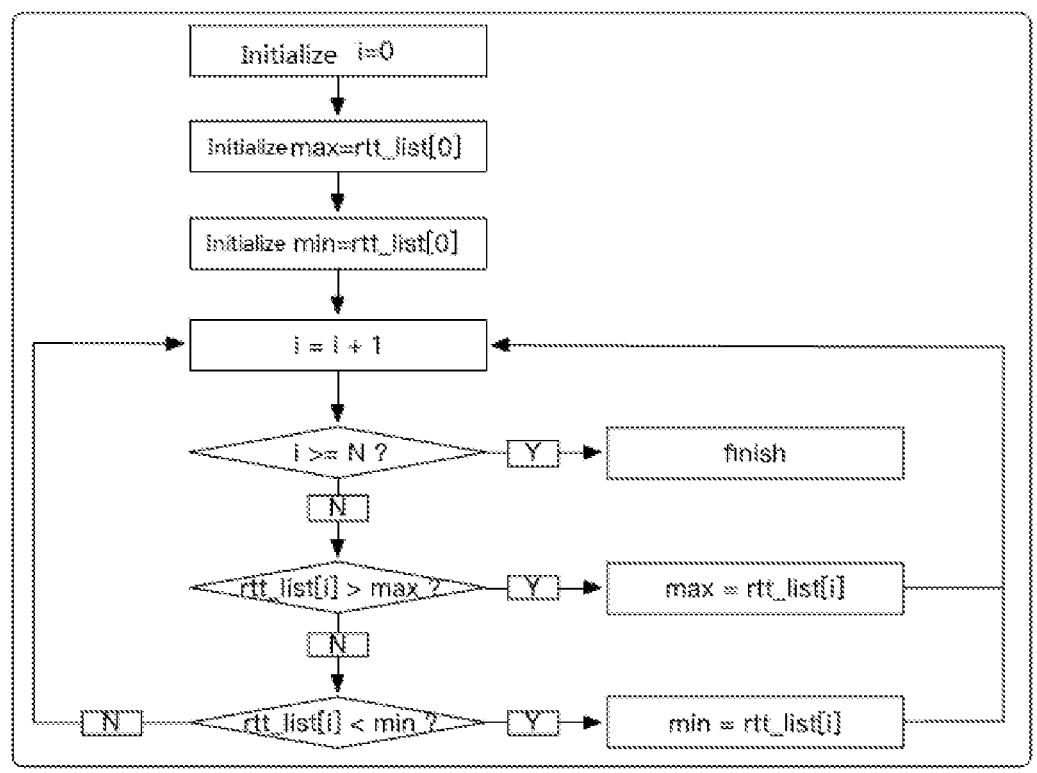
FIG. 3 is a schematic diagram of a process of calculating maximum RTT and minimum RTT according to an embodiment of the present disclosure.

Step 205 in FIG. 2 shows a process of calculating the maximum RTT and minimum RTT. As shown in FIG. 3, first, an initialization is performed by i=0, rtt_max=rtt_list [0], and rtt_min=rtt_list[0]. Then, it makes i=i+1, all RTTs of rtt_list are traversed in turn until the maximum RTT in the rtt_list is found as an assignment of rtt_max, and the minimum RTT in the rtt_list is found as an assignment of the rtt_min.

Step 103, an amount of data in the latest RTT is obtained.

To determine the amount of data, the following fields may be added into the tcp_sock structure to record the amount of data:

| Type | Field name | Remarks |
| --- | --- | --- |
| unsigned long long | last_send_bytes | To record the amount of data sent by the connection until the end of a last sliding period, which includes newly-transmitted and re-transmitted messages |
| unsigned long long | send_bytes | To record the amount of data sent by the connection until the current (the end of the current sliding period), including newly-transmitted and re-transmitted messages |
| unsigned long long | last_delivered_bytes | To record the amount of data acknowledged by the connection until the end of the last sliding period, including amount of data acknowledged by ACK and SACK |
| unsigned long long | delivered_bytes | To record the amount of data acknowledged by the connection until the current (the end of the current sliding period), including amount of data acknowledged by ACK and SACK |
| unsigned int | record_timestamp | A time point of RTT evaluation of last time (namely, a cutoff time of the last sliding period) |

Figure 4:
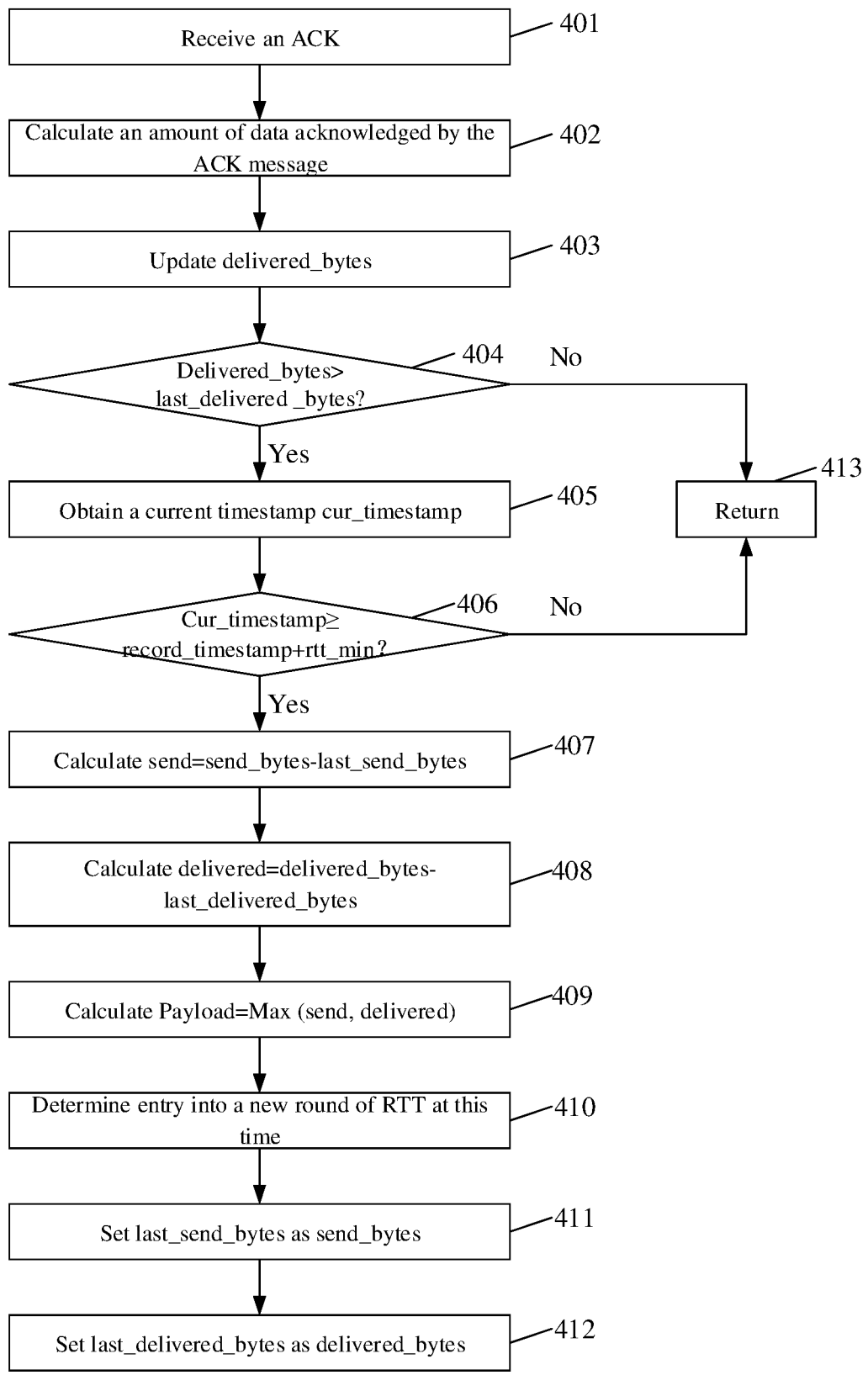
FIG. 4 is a schematic flow chart of obtaining an amount of data in the latest RTT according to an embodiment of the present disclosure.

Upon initialization of connection, last_send_bytes, send_bytes, last_delivered_bytes and delivered_bytes are all initialized as 0. When data is transmitted each time, the transmitted data is recorded in sent_bytes. When ACK is received each time, the amount of data acknowledged this time is recorded into delivered_bytes. To make statistics of the speed data within each RTT, a new calculation period is evaluated when ACK comes each time, and whether the current ACK is in a new calculation period is determined. A specific processing procedure is shown in FIG. 4, which mainly includes steps 401-412.

Step 401, ACK is received, the evaluation process is triggered by the reception of the ACK, and begins at the congestion control inlet.

Step 402, an amount of message data acknowledged by ACK is calculated, wherein an amount of message data acknowledged this time, including an amount of message data acknowledged by the ACK, and an amount of message data acknowledged by Selective Acknowledgement (SACK), is calculated according to the ACK by scanning a sending window, and by comparing data segments acknowledged by ACK and SACK one by one.

It needs to be appreciated that in a consideration of an actual situation of the scenario of SACK, the amount of data acknowledged is calculated by adding the number of bytes acknowledged by SACK. The SACK is a TCP option, which is used to notify the transmitter which message segments get lost, which message segments are retransmitted, and which message segments are already received in advance. According to this information, those message segments that really get lost will be retransmitted in TCP. It needs to be noted that only when disordered packets are received, the SACK might be sent, and the ACK of the TCP is built on the basis of accumulated acknowledgement. That is to say, if a serial number of a received message segment is the same as that of a desired message segment, an accumulated ACK will be sent. The SACK is only with respect to the message segment that reaches in disorder.

Step 403, delivered_bytes is updated, wherein the amount of data acknowledged by the ACK of this time is added to delivered_bytes, a value of delivered_bytes is an amount of data totally acknowledged from establishment of the connection until right now.

Step 404, delivered_bytes is determined; only when delivered_bytes is larger than last_delivered_bytes, the speed is calculated, namely, the procedure turns to step 405; otherwise, step 413 is performed.

Step 405, a current timestamp is obtained in a millisecond granularity by directly obtaining a jiffies value in a Linux core, and then assigning the obtained jiffies value to cur_timestamp.

Step 406, the current time stamp is determined; only when a time interval between cur_timestamp and record_timestamp exceeds the current minimum RTT (namely, rtt_min), the speed value is calculated, namely, the procedure turns to step 407; otherwise, step 413 is performed.

Step 407, an increment amount of data sent is calculated, from a difference of send_bytes and last_send_bytes.

Step 408, an increment amount of data acknowledged is calculated, from a difference of delivered_bytes and last_delievered_bytes.

Step 409, an amount of data is evaluated, wherein the amount of data is the maximum of the increment amount of data sent and the increment amount of data acknowledged, and the maximum is assigned to payload.

Step 410, a new round of RTT is determined; when the current time point is determined as a new RTT starting point, the speed is to be calculated.

Step 411, last_send_bytes is updated, wherein after determining the new round of RTT, last_send_bytes is updated, and the updated last_send_bytes is set as send_bytes.

Step 412, last_delivered_bytes is updated, wherein after determining a new round of RTT, last_delivered_bytes is updated, and the updated last_delivered_bytes is set as delivered_bytes.

Step 413, the procedure returns, i.e., the current time point is not a starting point of a new RTT.

Step 104, according to the amount of data in the latest RTT, the maximum RTT, minimum RTT and average RTT in the current sliding period, a minimum speed, a maximum speed and an average speed are calculated respectively.

After completion of the RTT determination in last step, if the current time is a new RTT starting point, calculation of the speed value begins. The calculating process is shown as follows:

calculating a minimum speed: speed_min=payload/rtt_max;

calculating a maximum speed: speed_max=payload/rtt_min;

calculating an average speed: speed_ava=payload/rtt_ava;

wherein payload represents the amount of data in the latest RTT, rtt_max represents a maximum RTT within the current sliding period, rtt_min represents a minimum RTT within the current sliding period, and rtt_ava represents an average RTT within the current sliding period.

Step 105, according to the minimum speed, maximum speed and average speed, the speed change gradient information is calculated.

In the initialization of TCP connection, a group of coefficients [w0, w1, w2, w3] are set, and initial values thereof are set as follows:

| Variables | Initial values |
|---|---|
| w0 | ¼ |
| w1 | ¼ |
| w2 | ¼ |
| w3 | ¼ |

The speed change gradient information D=[D0, D1, D2, D3] is calculated according to preset coefficients [w0, w1, w2, w3], and according to the following equations:

$$var = w0*CONST + w1*speed\_max + w2*speed\_min + w3*speed\_ava,$$

$$delta = speed\_max - var,$$

$$D0 = p*delta*CONST,$$

$$D1 = p*delta*speed\_max,$$

$$D2 = p*delta*speed\_min,$$

$$D3 = p*delta*speed\_ava,$$

where p is a preset scaling factor, which may be set as 1/100 or other values according to an actual requirement; CONST is a present constant, which may be set as 500, representing a speed of 500K bytes per second, and certainly may also be set as other values according to an actual requirement; speed_max represents the calculated maximum speed, speed_min represents the calculated minimum speed, and speed_ava represents the calculated average speed. After D0, D1, D2, D3 are calculated, calculation of the speed change gradient information is completed.

Step 106, a speed prediction value is calculated according to the speed change gradient information.

Specifically, a group of speed vectors X=[x0, x1, x2, x3] is maintained, wherein x0 corresponds to CONST, x1 corresponds to the measured maximum speed_max, x2 corresponds to the measured minimum speed_min, and x3 corresponds to the measured average speed_ava.

In the present solution, it is assumed that the relationship between an actual speed and the measured speed are as follows:

$$SPEED = w0*x0 + w1*x1 + w2*x2 + w3*x3.$$

The speed change gradient information D is already obtained as stated above. To predict the actual speed, the vector W is updated first. A process of updating W is as follows:

according to the preset coefficients [w0, w1, w2, w3] and the speed change gradient information, updating the vector W [w0', w1', w2', w3'], so that w0'=w0+D0, w1'=w1+D1, w2'=w2+D2, w3'=w3+D3.

Subsequently, the speed prediction value SPD_h is calculated according to the following equation:

$$SPD\_h = w0'*CONST + w1'*speed\_max + w2'*speed\_min + w3'*speed\_ava.$$

The value SPD_h is the speed prediction value obtained in the present solution, i.e., the SPD_h value is considered as a link bandwidth actually useable by the TCP connection.

In an implementation mode, in consideration of errors in the calculation process, the speed prediction value may be modified properly according to historical speed information, and the modified value is regarded as a final prediction value. Since the link will change to a different degree under the scenario of the wide area network, to more effectively use the bandwidth, adjustment of the speed value is performed actively during data transmission, and the speed value after the adjustment is SPD_adj. One RTT index C_INDEX is maintained, an initial value of the index is 0, and adjustment quantities corresponding to different index values are shown below:

| Index | Remarks |
|---|---|
| 0 | Remain unchanged, namely, SPD_adj = SPD_h |
| 1 | Remain unchanged, namely, SPD_adj = SPD_h |
| 2 | Increase by 30%, namely, SPD_adj = 1.3*SPD_h |
| 3 | Remain unchanged, namely, SPD_adj = SPD_h |
| 4 | Increase by 15%, namely SPD_adj = 1.15*SPD_h |
| 5 | Remain unchanged, namely, SPD_adj = SPD_h |
| 6 | Reduce by 15%, namely, SPD_adj = 0.85*SPD_h |
| 7 | Remain unchanged, namely, SPD_adj = SPD_h |
| 8 | Reduce by 30%, namely, SPD_adj = 0.7*SPD_h |

Figure 5:
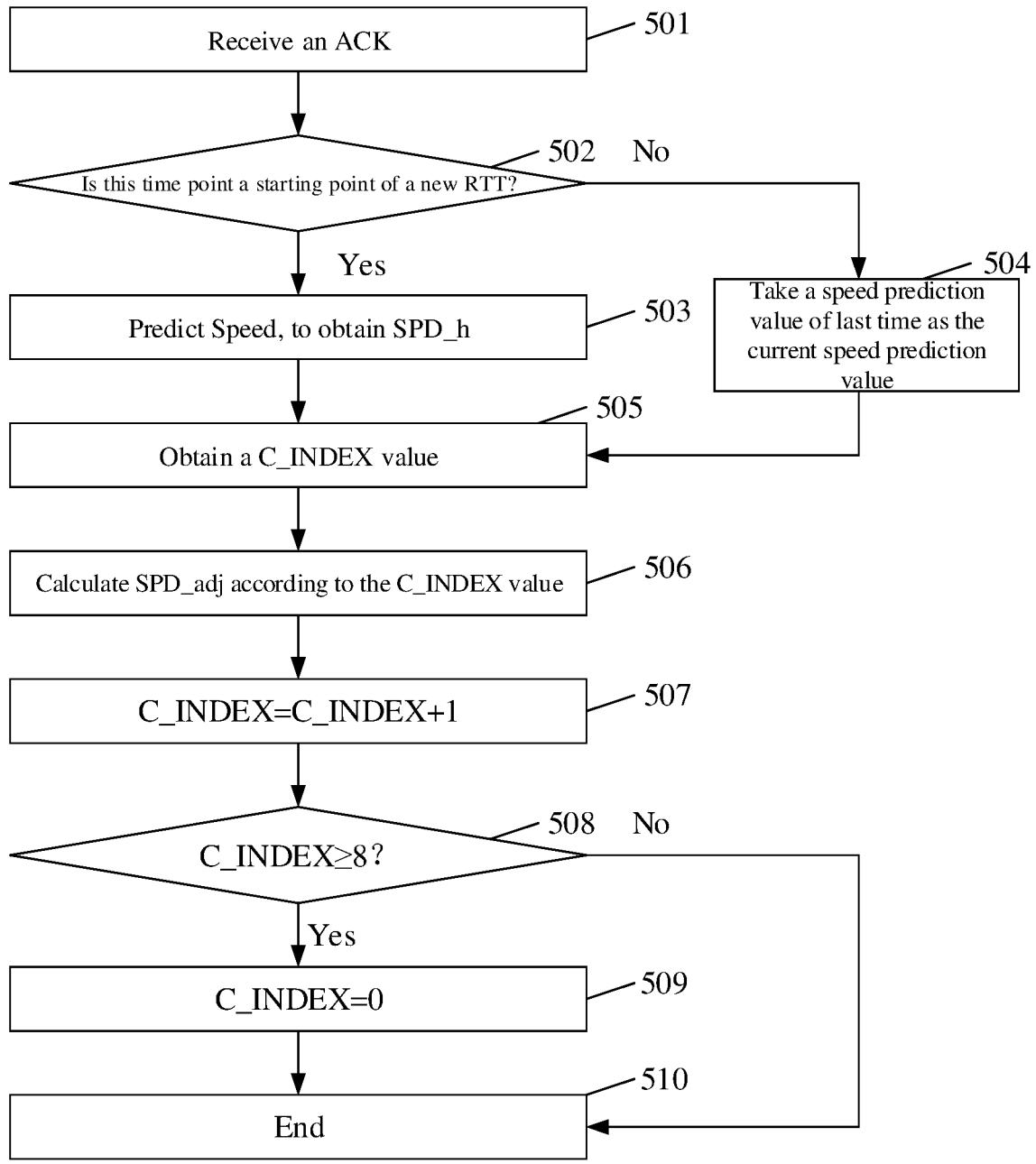
FIG. 5 is a schematic flow chart of a speed-modifying method according to an embodiment of the present disclosure.

A method of modifying the speed is as shown in FIG. 5, which mainly includes steps 501-510.

Step 501, an ACK is received; an evaluation process is triggered by the arrival of the ACK, and begins at the congestion control inlet.

Step 502, a new round of RTT is determined; a speed is re-estimated in a new round, namely, the method proceeds to step 503; otherwise, the method turns to step 504.

Step 503, the speed is predicted; a speed prediction is performed according to the above-mentioned procedure, to obtain SPD_h.

Step 504, in case of a non-new round of RTT, a previous speed prediction value is directly used as a speed prediction value of this time, then the method proceeds to step 505.

Step 505, C_INDEX is obtained.

Step 506, the speed prediction value is updated according to the C_INDEX.

Step 507: the C_INDEX is updated, by adding the value of C_INDEX by 1.

Step 508: C_INDEX reset is determined, wherein a range of the C_INDEX is 0 to 8, the method turns to step 509 if C_INDEX+1 is larger than or equal to 8; otherwise, the method turns to step 510.

Step 509: C_INDEX is reset, which is reset as 0.

Step 510: the method ends.

Figure 6:
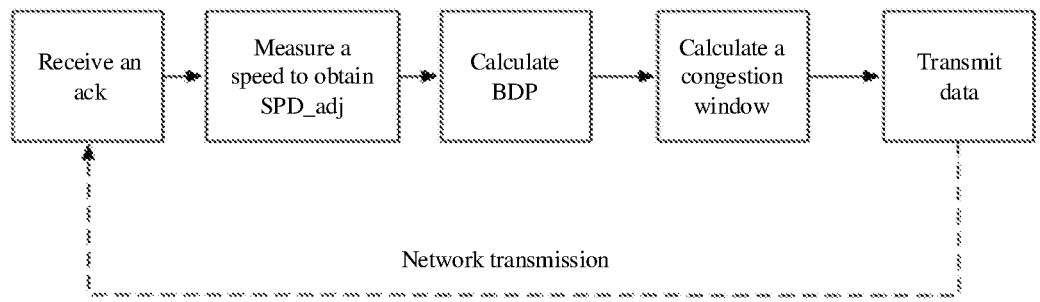
FIG. 6 is a schematic diagram of a congestion control process according to an embodiment of the present disclosure.

In another implementation mode, after the modified speed prediction value SPD_adj is obtained, SPD_adj may be used for TCP congestion control. Specifically, referring to FIG. 6, the calculation of the congestion window mainly includes:

calculating a Bandwidth-delay product (BDP) according to the modified speed prediction value by an equation:

BDP=SPD_adj*rtt_min, wherein rtt_min represents the minimum RTT within the current sliding period; and calculating a congestion window (CWND) according to the calculated BDP by an equation: CWND=BDP/MSS, wherein MSS represents a preset max segment size (set by a TCP connection).

Then, subsequent data transmission is performed according to the calculated congestion window.

Embodiment 2

Figure 7:
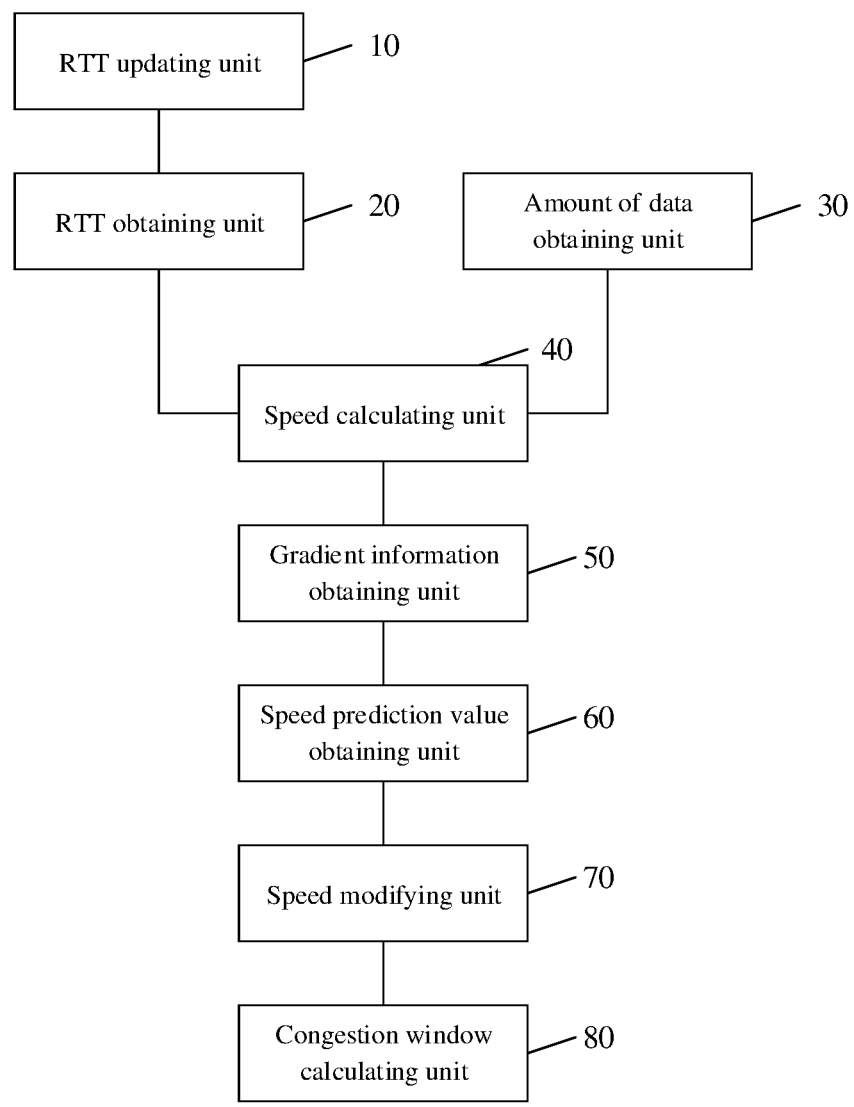
FIG. 7 is a schematic diagram of a component structure of an apparatus for measuring a data transmission speed according to an embodiment of the present disclosure.

Corresponding to the method according to embodiment 1 of the present disclosure, an apparatus for measuring a data transmission speed is further provided according to embodiment 2 of the present disclosure. The apparatus is applied to a server side. As shown in FIG. 7, the apparatus mainly includes:

an RTT updating unit 10 configured to update RTTs within a current sliding period upon receiving an ACK message from a client device;

an RTT obtaining unit 20 configured to calculate to obtain a maximum RTT, a minimum RTT and an average RTT within the current sliding period;

an amount of data obtaining unit 30 configured to obtain an amount of data in the latest RTT;

a speed calculating unit 40 configured to calculate a minimum speed, a maximum speed and an average speed respectively, according to the amount of data in the latest RTT, and the maximum RTT, the minimum RTT and the average RTT within the current sliding period;

a gradient information obtaining unit 50 configured to calculate speed change gradient information according to the minimum speed, the maximum speed and the average speed;

a speed prediction value obtaining unit 60 configured to calculate a speed prediction value according to the speed change gradient information.

In an implementation mode, the RTT updating unit 10 is further configured to:

obtain the latest RTT upon receiving the ACK message from the client device;

update an RTT list rtt_list according to the latest RTT, the updated rtt_list recording N RTTs, the N RTTs including the latest RTT and N−1 RTTs which are sequentially closest to the latest RTT in time, the updated rtt_list being rtt_list within the current sliding period;

wherein N is an integer larger than 1.

In an implementation mode, the RTT obtaining unit 20 is further configured to:

traverse all RTTs in the rtt_list in the current sliding period in turn, select an RTT with a maximum time interval as the maximum RTT, and an RTT with a minimum time interval as the minimum RTT, and obtain the average RTT by dividing a sum of all RTTs in the rtt_list by the number N of the RTTs in the rtt_list.

In an implementation mode, the amount of data obtaining unit 30 is further configured to:

obtain preset fields, including last_send_bytes, send_bytes, last_delivered_bytes, delivered_bytes and record_timestamp, wherein the amount of data sent by the end of a last sliding period is recorded into last_send_bytes, the amount of data sent by the end of the current sliding period is recorded into send_bytes, the amount of data acknowledged by the end of the last sliding period is recorded into last_delivered_bytes, the amount of data acknowledged by the end of the current sliding period is recorded into delivered_bytes, and a cutoff time of the last sliding period is recorded into record_timestamp;

calculate the amount of data sent within the latest RTT by an equation send=send_bytes-last_send_bytes, and the amount of data acknowledged within the latest RTT by an equation delivered=delivered_bytes-last_delivered_bytes; and select the amount of data with a maximum value as the amount of data, payload, in the latest RTT, from the amount of data, send, sent within the latest RTT, and the amount of data, delivered, acknowledged within the latest RTT.

In an implementation mode, the speed calculating unit 40 is further configured to:

calculate a minimum speed: speed_min=payload/rtt_max;

calculate a maximum speed: speed_max=payload/rtt_min;

calculate an average speed: speed_ava=payload/rtt_ava;

wherein payload represents the amount of data in the latest RTT, rtt_max represents a maximum RTT within the current sliding period, rtt_min represents a minimum RTT within the current sliding period, and rtt_ava represents an average RTT within the current sliding period.

In an implementation mode, the gradient information obtaining unit 50 is further configured to:

calculate speed change gradient information D=[D0, D1, D2, D3] according to a group of preset coefficients [w0, w1, w2, w3], and the following equations:

var=$w0$*CONST+$w1$*speed_max+$w2$*speed_min+$w3$*speed_ava, delta=speed_max−var, $D0$=$p$*delta*CONST, $D1$=$p$*delta*speed_max, $D2$=$p$*delta*speed_min, $D3$=$p$*delta*speed_ava, wherein p is a preset scaling factor, CONST is a present constant, speed_max represents the calculated maximum speed, speed_min represents the calculated minimum speed, and speed_ava represents the calculated average speed.

In an implementation mode, the speed prediction value obtaining unit 60 is further configured to:

update a vector W [w0', w1', w2', w3'] according to the preset coefficients [w0, w1, w2, w3] and the speed change gradient information, so that w0'=w0+D0, w1'=w1+D1, w2'=w2+D2, w3'=w3+D3;

calculate the speed prediction value SPD_h according to an equation:

SPD_$h$=$w0'$*CONST+$w1'$*speed_max+$w2'$*speed_min+$w3'$*speed_ava.

In an implementation mode, the apparatus further includes: a speed modifying unit 70 configured to modify the speed prediction value according to a maintained speed adjustment index C_INDEX, to obtain a modified speed prediction value.

In an implementation mode, the apparatus further includes a congestion window calculating unit 80 configured to:

calculate a BDP according to the modified speed prediction value by an equation: BDP=SPD_adj*rtt_min, wherein SPD_adj represents the modified speed prediction value, and rtt_min represents the minimum RTT within the current sliding period; and calculate a CWND according to the calculated BDP by an equation: CWND=BDP/MSS, wherein MSS represents a preset max segment size.

Functions of the above units may be implemented through hardware, or by hardware executing corresponding software. The hardware or software includes one or more units corresponding to the above functions.

Embodiment 3

Figure 8:
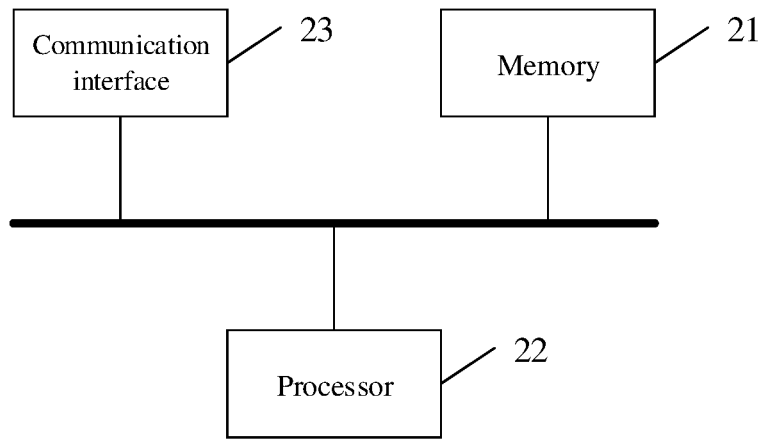
FIG. 8 is a schematic diagram of a component structure of a server-side device according to an embodiment of the present disclosure.

An information classification apparatus is provided according to embodiment 3 of the present disclosure. As shown in FIG. 8, the apparatus includes: a memory 21 and a processor 22, a computer program executable on the processor 22 being stored in the memory 21. The processor 22 implements the method for measuring a data transmission speed described in the above embodiment upon executing the computer program. The number of each of the memory 21 and processor 22 may be one or more.

The apparatus further includes:

a communication interface 23 configured to enable communication between the memory 21 and the processor 22.

The memory 21 may include a high-speed RAM memory, and may further include a non-volatile memory, for example at least magnetic disk memory.

If the memory 21, the processor 22 and the communication interface 23 are implemented separately, the memory 21, processor 22 and communication interface 23 may be interconnected via a bus and complete mutual communication. The bus may be an Industry Standard Architecture (ISA) bus, a Peripheral Component Interconnection (PCI) bus or an Extended Industry Standard Component (EISA) bus. The bus may be classified into address bus, data bus, control bus and so on. For ease of illustration, the bus is represented with only one thick line in FIG. 8, but this does not mean that there is only one bus or one type of bus.

Optionally, upon specific implementation, if the memory 21, processor 22 and communication interface 23 are integrated on one chip, the memory 21, processor 22 and communication interface 23 may complete intercommunication via an internal interface.

To sum up, the embodiments of the present disclosure propose a method based on server-side unilateral speed measurement, which calculates the speed value of data transmission depending on the TCP behaviors and network transmission properties, not by directly obtaining an average value, the method actively tracking changes of an actual speed of the TCP connection during transmission, to obtain a more accurate transmission speed, thereby improving the TCP transmission speed, and improving the user's experience.

All scenarios of embodiments of the present disclosure employ the same policy without adjusting parameters according to different environments, deployment is only performed on the server side, and the client device's participation is not needed.

Through embodiments of the present disclosure, the estimation of the link bandwidth is more accurate, the link bandwidth obtained from measurement is directly used to calculate the congestion control window to make the transmission procedure of the TCP more precise.

In the case of link fluctuations, the actual link bandwidth may be stably tracked, and when the link bandwidth changes abruptly, changes may be quickly sensed and quickly converged according to the method. The solution has remarkable advantages as compared with solutions such as weighted average and moving average widely applied in the industry.

Under a wide area network scenario, the link bandwidth predicted by the solution is close to the actual value. Based on this, it is possible to perform congestion window evaluation by a CDN kernel protocol stack congestion control algorithm based on the prediction value. Compared with a default transmission mechanism of the Linux kernel, a slow speed ratio falls after the solution is used. The slow speed ratio refers to a request proportion in which a download speed is smaller than 100 KBps.

Advantageous effects of embodiments of the present disclosure are further analyzed, as compared with several speed measurement methods in the related technologies below.

Figure 9:
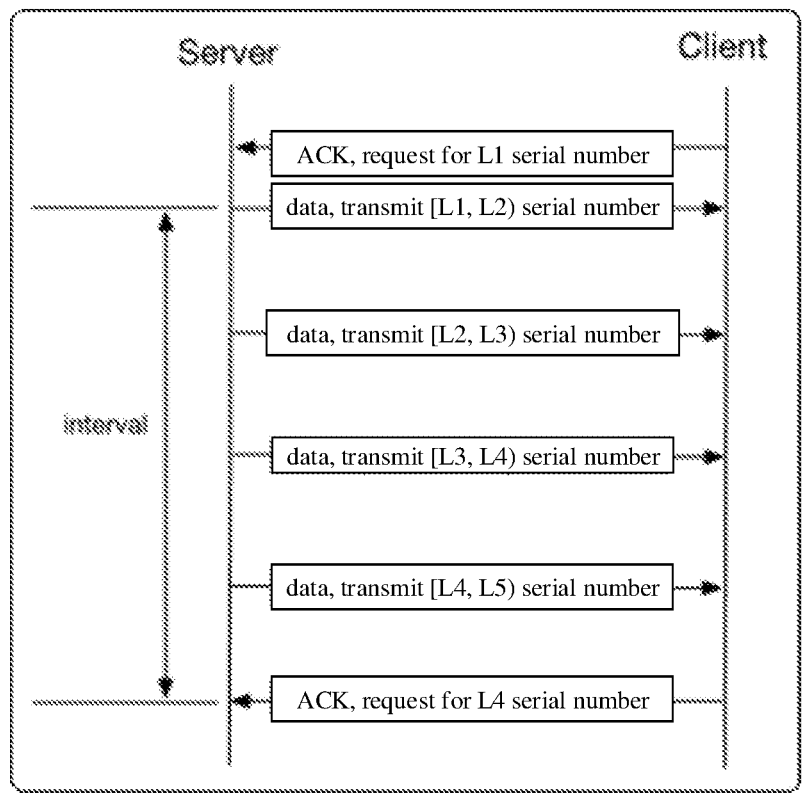
FIG. 9 is a schematic diagram of a method of obtaining an instantaneous value in an RTT in a relevant technology.

FIG. 9 is a schematic diagram of a method of obtaining an instantaneous value in an RTT.

The TCP transmission is performed according to RTTs in turn. It is possible to, in each RTT, obtain an instantaneous speed of the current RTT by obtaining a maximum value from the number of sent_bytes and number of acknowledged bytes, and dividing the maximum value by a time interval of the RTT. In FIG. 9, the interval is a time interval of an RTT. In this RTT, the total number of the sent_bytes is L5-L1, the total number of the acknowledged bytes is L4-L1, and a manner of calculating the speed is shown as follows:

$$send\_bytes = L5 - L1,$$

$$acked\_bytes = L4 - L1,$$

$$speed = \max(send\_bytes, acked\_bytes)/interval,$$

where send_bytes represents the total number of sent_bytes, acked_bytes represents the total number of acknowledged bytes. In actual situations, with the scenario of the SACK being considered, the acked_bytes is calculated by further adding the number of bytes acknowledged by SACK.

Upon completion of the calculation, speed may be regarded as the instantaneous value measured in the current RTT, namely, an average transmission speed within an RTT.

The method of obtaining the instantaneous value in the RTT mainly has the following drawbacks:

1. Under the local area network scenario, the speed calculation value fluctuates to a different degree, using the instantaneous value to estimate the link speed causes constant changes of the estimation value, which cannot be converged in a long period of time.
2. In a scenario that the instantaneous value increases suddenly, the estimation value of the link is too radical; in a scenario that the instantaneous value reduces suddenly, the estimation value of the link is too conservative.
3. It is impossible to, according to changes of the speed value, accurately determine that the link situation changes apparently.

In the embodiments of the present disclosure, as compared with the method of obtaining the instantaneous value in the RTT, the speed value of data transmission is calculated not by directly obtaining the average value, and less affected by instantaneous fluctuations; it is possible to, based on measurement and calculation values in the two dimensions RTT and an amount of data, actively track changes of the actual speed of the TCP connection during transmission, to obtain a more accurate transmission speed.

Figure 10:
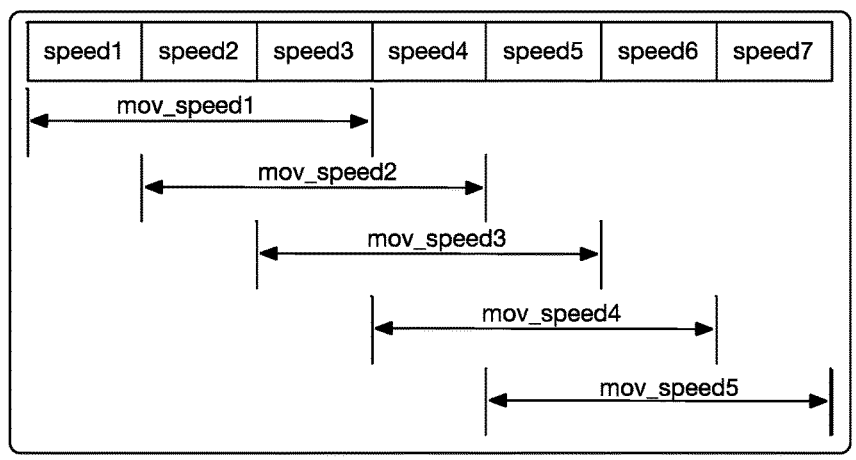
FIG. 10 is a schematic diagram of a method of obtaining a moving average value within a period in a relevant technology.

FIG. 10 is a schematic diagram of a method of obtaining a moving average value within a period. In this method, it is feasible to set a moving window, perform speed measurement in each transmission RTT, and take an average value in the whole moving window as a speed value. As time goes by, the starting point of the window is adjusted by moving forward one RTT each time, and calculation is performed each time. In FIG. 10, speed1, speed2 to speed7 are speed values calculated respectively in each RTT, and mov_speed takes an average value in the sliding period, namely, $$mov\_speed1=(speed1+speed2+speed3)/3$$

$$mov\_speed2=(speed2+speed3+speed4)/3$$

$$mov\_speed3=(speed3+speed4+speed5)/3$$

$$mov\_speed4=(speed4+speed5+speed6)/3$$

$$mov\_speed5=(speed5+speed6+speed7)/3$$

where 3 is the sliding period and may be adjusted as other values. This method, through moving averaging, eliminates speed fluctuations in a short time period, so that the obtained speed value is smoother, and thereby the actual speed of the link is estimated with the smoother speed value.

As compared with the instantaneous value, the speed value obtained by the moving average algorithm may exclude influence from some sudden situations, and the estimation of the link bandwidth is more stable.

However, the method of obtaining the moving average value with the period mainly has the following drawbacks:
1. The sensitivity of sensing changes of the speed value is related to the sliding window. The smaller the sliding window is, the more sensitive the sensing of changes is, and the smoothness will reduce; when the sliding window increases, the sensing of changes is more insensitive, and the smoothness will increase. Under different scenarios, change situations of the link differ a lot. It is difficult that value selection of the sliding window conforms to an exact policy.
2. What is obtained from moving average calculation is an average speed in the whole window. As far as the estimation of the link is concerned, a certain delay exists. The instantaneous speed changes abruptly, and needs to take a longer time period to sense.

In the embodiments of the present disclosure, as compared with the method of obtaining the moving average value in the period, the speed value of data transmission is calculated by not directly obtaining the average value, the sensitivity of sensing changes of the speed value is not associated with the sliding window, and there are not the above-mentioned drawbacks. In addition, the measurement and calculation values based on the two dimensions RTT and an amount of data are less affected by the instantaneous speed fluctuation, and the obtained measured speed value is more accurate.

Figure 11:
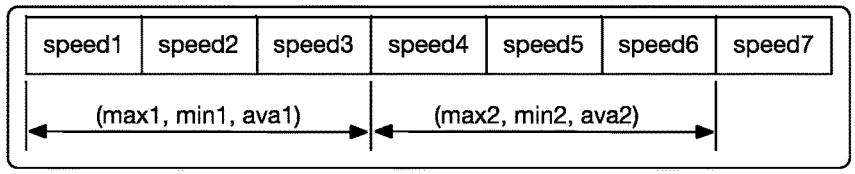
FIG. 11 is a schematic diagram of a method of obtaining a maximum, a minimum and an average in a time window in a relevant technology.

As shown in FIG. 11, FIG. 11 is a schematic diagram of a method of obtaining a maximum value, a minimum value and an average value in a time window. In the method, it is feasible to set a time window, and calculate the maximum value, the minimum value and the average value in the time window. In FIG. 11, speed1, speed2 to speed7 are speed values calculated respectively in each RTT, and max, min and ava choose the maximum value, minimum value and average value within the period, namely, $$max\ 1=max(speed1,speed2,speed3)$$

$$min\ 1=min(speed1,speed2,speed3)$$

$$ava1=(speed1+speed2+speed3)/3$$

$$max\ 2=max(speed4,speed5,speed6)$$

$$min\ 2=min(speed4,speed5,speed6)$$

$$ava2=(speed4+speed5+speed6)/3$$

where 3 is the sliding period and may be adjusted as other values.

The method of obtaining the maximum value and minimum value within the time window can be implemented simply. The average value may be calculated according to certain weighting coefficients, as shown below:

$$ava=(x*speed1+y*speed2+z*speed3)/3$$

where x, y, and Z represent weighting coefficients.

The method of obtaining the maximum value, the minimum value and the average value in the time window mainly has the following drawbacks:
1. The update of the speed is slower, and a new measurement value cannot be obtained unless a time window ends completely.
2. At a neighboring time window, the speed value might jump, which causes burrs to appear in the measurement value.
3. Under different scenarios, change situations of the link differ a lot. It is difficult that value selection of the time window conforms to an exact policy.

In the embodiments of the present disclosure, as compared with the method of obtaining the maximum value, minimum value and average value in time window, the sensitivity of sensing changes of the speed value is not directly associated with the time window, and there are not the above-mentioned drawbacks. In addition, the measurement and calculation values based on the two dimensions RTT and an amount of data is less affected by the instantaneous speed fluctuation, and the obtained measured speed value is more accurate.

In the depictions of the description, reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In addition, terms "first" and "second" are only used for illustration purpose and cannot be understood as indicating or implying relative importance or implicitly indicating the number of the meant technical features. Hence, a feature defined by "first" and "second" may explicitly or implicitly indicate that at least one said feature is included. In the depictions of the present disclosure, "a plurality of" means two or more, unless otherwise definitely and specifically defined.

Any procedure or method described in the flow charts or described in any other way herein may be understood as a module, fragment or portion of code representing executable instructions that include one or more steps for implementing a particular logical function or process. Moreover, the scope of preferred embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or steps shown in the flow chart or described in other manners herein, for example, an ordered list of executable instructions for realizing the logical function, may be specifically achieved in any computer readable medium for use by the instruction execution system, device or equipment (such as the system based on a computer, the system including a processor or other systems capable of obtaining the instruction from the instruction execution system, device and equipment and executing the instruction), or for use in combination with the instruction execution system, device and equipment. As to the specification, "the computer readable medium" may be any device adapted for including, storing, communicating, propagating or transferring programs for use by or in combination with the instruction execution system, device or equipment.

In embodiments of the present disclosure, the computer readable medium may be a computer readable signal medium or a computer readable storage medium or any combination of the two. More specific examples (non-exhaustive list) of the computer readable storage medium include an electronic connection (an electronic device) with one or more wires, a portable computer disc box (a magnetic device), a random access memory (RAM), a read only memory (ROM), an erasable programmable read-only memory (EPROM or a flash memory), an optical fiber device and a portable compact disk read-only memory (CDROM). In addition, the computer readable storage medium may even be a paper or other appropriate medium on which a program can be printed, this is because, for example, the paper or other appropriate medium may be optically scanned and then edited, decrypted or processed in other appropriate manners when necessary to obtain the program in an electric manner, and then the program may be stored in the computer memory.

In embodiments of the present disclosure, the computer-readable signal medium may can include a data signal that is propagated in baseband or as part of a carrier wave. Such propagated data signal may take many forms, including, but not limited to, electromagnetic signal, optical signal or any suitable combinations thereof. The computer-readable signal medium may further be any computer-readable medium other than the computer-readable storage medium, and the computer-readable medium may send, propagate or transmit a program for use by or in combination with an instruction execution system, input method or device. The program code included by the computer-readable medium may be transmitted with any suitable medium, including, but not limited to radio, electric wire, optical cable, radio frequency (RF) or the like, or any suitable combination thereof.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if the steps or methods are realized by the hardware, likewise in another embodiment, the steps or methods may be realized by one or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or some of the steps in the method of the above embodiments can be implemented by instructing related hardware via programs, the program may be stored in a computer readable storage medium, and the program includes one step or a combination of the steps of the method when the program is executed.

In addition, function units of the embodiments of the present disclosure may be integrated in a processing module, or these units may exist separately and physically, or two or more units are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this. Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. A method for measuring a data transmission speed, applied to a server side, the method comprising:
   updating Round-Trip Times (RTTs) within a current sliding period upon receiving an acknowledgement (ACK) message from a client device;
   calculating a maximum RTT, a minimum RTT and an average RTT within the current sliding period;
   obtaining an amount of data in the latest RTT;
   calculating a minimum speed, a maximum speed and an average speed respectively, according to the amount of data in the latest RTT, and the maximum RTT, the minimum RTT and the average RTT within the current sliding period;
   calculating speed change gradient information according to the minimum speed, the maximum speed and the average speed; and
   calculating a speed prediction value according to the speed change gradient information.

2. The method according to claim 1, wherein updating RTTs within the current sliding period upon receiving the ACK message from the client device comprises:
   obtaining the latest RTT upon receiving the ACK message from the client device; and
   updating an RTT list rtt_list according to the latest RTT, the updated rtt_list recording N RTTs, the N RTTs including the latest RTT and N−1 RTTs which are sequentially closest to the latest RTT in time, the updated rtt_list being rtt_list within the current sliding period;
   wherein N is an integer larger than 1.

3. The method according to claim 2, wherein calculating the maximum RTT, the minimum RTT and the average RTT within the current sliding period comprises:

traversing all RTTs in the rtt_list in the current sliding period in turn;
selecting an RTT with a maximum time interval as the maximum RTT, and an RTT with a minimum time interval as the minimum RTT; and
obtaining the average RTT by dividing a sum of all RTTs in the rtt_list by the number N of the RTTs in the rtt_list.

4. The method according to claim 1, wherein obtaining the amount of data in the latest RTT comprises:
obtaining preset fields including last_send_bytes, send_bytes, last_delivered_bytes, delivered_bytes and record_timestamp, wherein the amount of data sent by the end of a last sliding period is recorded into last_send_bytes, the amount of data sent by the end of the current sliding period is recorded into send_bytes, the amount of data acknowledged by the end of the last sliding period is recorded into last_delivered_bytes, the amount of data acknowledged by the end of the current sliding period is recorded into delivered_bytes, and a cutoff time of the last sliding period is recorded into record_timestamp;
calculating the amount of data sent within the latest RTT by an equation send=send_bytes−last_send_bytes, and the amount of data acknowledged within the latest RTT by an equation delivered=delivered_bytes−last_delivered_bytes; and
selecting the amount of data with a maximum value as the amount of data (payload) in the latest RTT, from the amount of data (send) sent within the latest RTT, and the amount of data (delivered) acknowledged within the latest RTT.

5. The method according to claim 1, wherein calculating the minimum speed, the maximum speed and the average speed respectively, according to the amount of data in the latest RTT, and the maximum RTT, the minimum RTT and the average RTT within the current sliding period comprises:

calculating the minimum speed as:
$speed\_min = payload/rtt\_max$;

calculating the maximum speed as:
$speed\_max = payload/rtt\_min$; and calculating the average speed as:
$speed\_ava = payload/rtt\_ava$;

wherein payload represents the amount of data in the latest RTT, rtt_max represents the maximum RTT within the current sliding period, rtt_min represents the minimum RTT within the current sliding period, and rtt_ava represents the average RTT within the current sliding period.

6. The method according to claim 5, wherein calculating speed change gradient information according to the minimum speed, the maximum speed and the average speed comprises:
calculating speed change gradient information D=[D0, D1, D2, D3] according to a group of preset coefficients [w0, w1, w2, w3], and following equations:

$var = w0*CONST + w1*speed\_max + w2*speed\_min + w3*speed\_ava$, $delta = speed\_max - var$, $D0 = p*delta*CONST$, $D1 = p*delta*speed\_max$, $D2 = p*delta*speed\_min$, $D3 = p*delta*speed\_ava$, wherein p is a preset scaling factor, CONST is a present constant, speed_max represents the calculated maximum speed, speed_min represents the calculated minimum speed, and speed_ava represents the calculated average speed.

7. The method according to claim 6, wherein calculating the speed prediction value according to the speed change gradient information comprises:
updating a vector W [w0', w1', w2', w3'] according to the preset coefficients [w0, w1, w2, w3] and the speed change gradient information, so that w0'=w0+D0, w1'=w1+D1, w2'=w2+D2, w3'=w3+D3; and
calculating the speed prediction value SPD_h according to an equation:

$SPD\_h = w0'*CONST + w1'*speed\_max + w2'*speed\_min + w3'*speed\_ava$.

8. The method according to claim 1, wherein after obtaining the speed prediction value, the method further comprises:
modifying the speed prediction value according to a maintained speed adjustment index C_INDEX, to obtain a modified speed prediction value.

9. The method according to claim 8, wherein after obtaining the modified speed prediction value, the method further comprises:
calculating a Bandwidth-delay product (BDP) according to the modified speed prediction value by an equation: BDP=SPD_adj*rtt_min, wherein SPD_adj represents the modified speed prediction value, and rtt_min represents the minimum RTT within the current sliding period; and
calculating a congestion window (CWND) according to the calculated BDP by an equation: CWND=BDP/MSS, wherein MSS represents a preset max segment size.

10. An apparatus for measuring a data transmission speed, applied to a server side, the apparatus comprising:
a Round-Trip Time (RTT) updating unit configured to update RTTs within a current sliding period upon receiving an acknowledgement (ACK) message from a client device;
an RTT obtaining unit configured to calculate a maximum RTT, a minimum RTT and an average RTT within the current sliding period;
an amount of data obtaining unit configured to obtain an amount of data in the latest RTT;
a speed calculating unit configured to calculate a minimum speed, a maximum speed and an average speed respectively, according to the amount of data in the latest RTT, and the maximum RTT, the minimum RTT and the average RTT within the current sliding period;
a gradient information obtaining unit configured to calculate speed change gradient information according to the minimum speed, the maximum speed and the average speed;
a speed prediction value obtaining unit configured to calculate a speed prediction value according to the speed change gradient information.

11. The apparatus according to claim 10, wherein the RTT updating unit is further configured to:
obtain the latest RTT upon receiving the ACK message from the client device;

update an RTT list rtt_list according to the latest RTT, the updated rtt_list recording N RTTs, the N RTTs including the latest RTT and N−1 RTTs which are sequentially closest to the latest RTT in time, the updated rtt_list being rtt_list within the current sliding period; wherein N is an integer larger than 1.

12. The apparatus according to claim 11, wherein the RTT obtaining unit is further configured to:
traverse all RTTs in the rtt_list in the current sliding period in turn, select an RTT with a maximum time interval as the maximum RTT, and an RTT with a minimum time interval as the minimum RTT, and
obtaining the average RTT by dividing a sum of all RTTs in the rtt_list by the number N of the RTTs in the rtt_list.

13. The apparatus according to claim 10, wherein the amount of data obtaining unit is further configured to:
obtain preset fields, including last_send_bytes, send_bytes, last_delivered_bytes, delivered_bytes and record_timestamp, wherein the amount of data sent by the end of a last sliding period is recorded into last_send_bytes, the amount of data sent by the end of the current sliding period is recorded into send_bytes, the amount of data acknowledged by the end of the last sliding period is recorded into last_delivered_bytes, the amount of data acknowledged by the end of the current sliding period is recorded into delivered_bytes, and a cutoff time of the last sliding period is recorded into record_timestamp;
calculate the amount of data sent within the latest RTT by an equation send=send_bytes-last_send_bytes, and the amount of data acknowledged within the latest RTT by an equation delivered=delivered_bytes-last_delivered_bytes; and
select the amount of data with a maximum value as the amount of data (payload) in the latest RTT, from the amount of data (send) sent within the latest RTT, and the amount of data (delivered) acknowledged within the latest RTT.

14. The apparatus according to claim 10, wherein the speed calculating unit is further configured to:

calculate the minimum speed as:
$$speed\_min=payload/rtt\_max;$$

calculate the maximum speed as:
$$speed\_max=payload/rtt\_min; \text{ and}$$

calculate the average speed as: $speed\_ava=payload/rtt\_ava;$ wherein payload represents the amount of data in the latest RTT, rtt_max represents the maximum RTT within the current sliding period, rtt_min represents the minimum RTT within the current sliding period, and rtt_ava represents the average RTT within the current sliding period.

15. The apparatus according to claim 14, wherein the gradient information obtaining unit is further configured to:

calculate speed change gradient information D=[D0, D1, D2, D3] according to a group of preset coefficients [w0, w1, w2, w3], and following equations:

$$var=w0*CONST+w1*speed\_max+w2*speed\_min+w3*speed\_ava,$$

$$delta=speed\_max-var,$$

$$D0=p*delta*CONST,$$

$$D1=p*delta*speed\_max,$$

$$D2=p*delta*speed\_min,$$

$$D3=p*delta*speed\_ava,$$

wherein p is a preset scaling factor, CONST is a present constant, speed_max represents the calculated maximum speed, speed_min represents the calculated minimum speed, and speed_ava represents the calculated average speed.

16. The apparatus according to claim 15, wherein the speed prediction value obtaining unit is further configured to:
update a vector W [w0', w1', w2', w3'] according to the preset coefficients [w0, w1, w2, w3] and the speed change gradient information, so that w0'=w0+D0, w1'=w1+D1, w2'=w2+D2, w3'=w3+D3; and
calculate the speed prediction value SPD_h according to an equation:

$$SPD\_h=w0'*CONST+w1'*speed\_max+w2'*speed\_min+w3'*speed\_ava.$$

17. The apparatus according to claim 10, wherein the apparatus further comprises: a speed modifying unit configured to modify the speed prediction value according to a maintained speed adjustment index C_INDEX, to obtain a modified speed prediction value.

18. The apparatus according to claim 17, wherein the apparatus further comprises: a congestion window calculating unit configured to calculate a Bandwidth-delay product (BDP) according to the modified speed prediction value by an equation: BDP=SPD_adj*rtt_min, wherein SPD_adj represents the modified speed prediction value, and rtt_min represents the minimum RTT within the current sliding period; and
calculate a congestion window (CWND) according to the calculated BDP by an equation: CWND=BDP/MSS, wherein MSS represents a preset max segment size.

19. A server-side device, wherein the device comprises:
one or more processors, and
a storage device for storing one or more programs,
wherein the one or more programs, when executed by said one or more processors, enable said one or more processors to implement the method according to claim 1.

20. A non-volatile computer readable storage medium in which a computer program is stored, wherein the computer program, when executed by a processor, implements the method according to claim 1.

* * * * *